Patented Dec. 18, 1951

2,578,677

UNITED STATES PATENT OFFICE 2,578,677

METHOD OF MAKING PHOTOGRAPHIC SENSITIZING DYES

John H. Dessauer, Pittsford, and Michael A. Insalaco, Rochester, N. Y., assignors to The Haloid Company, Rochester, N. Y., a corporation of New York No Drawing. Application January 20, 1951, Serial No. 207,058

2 Claims. (Cl. 260—240.4)

This invention relates to a method of making photographic sensitizing dyes, with more particular reference to the production of certain asymmetric dyes that have proved highly efficient photographic sensitizers, and it has for its purpose to afford a simple, quick, economical and an altogether practical method of producing such dyes.

A more particular purpose of the invention is to provide an improved and economical method of manufacturing dyes which are photographic emulsion sensitizers, or which sensitize silver halide emulsions within the spectral range from approximately 480 millimicrons to approximately 560 millimicrons, depending on the type of emulsion and treatment.

Emulsions sensitized with such "short orthochromatic" dyes are less affected by the yellow and orange safelights generally used with contact, copying, and enlarging papers, so that emulsions containing these dyes can be used without the necessity of using the customary orthochromatic red safelights. These dyes also have the important advantage that when used in the usual amounts as a silver halide emulsion photographic sensitizer, no appreciable dye stain is left in the coated surface of the print after processing. The dyes fix out satisfactorily during processing and this is extremely advantageous and in fact essential for photographic papers where well defined pure whites are required.

In application Ser. No. 610,460, filed August 13, 1945, now abandoned, there was disclosed a process of preparing photographic sensitizing dyes which involves the condensation of an N-substituted rhodanine compound with the quaternary salt of a heterocyclic nitrogen compound having a reactive alkyl group in the alpha position to the nitrogen atom, in the presence of a base, and without any linking agents such as anhydrides, orthoesters, etc. It has now been found that photosensitizing dyes in general and particularly many dyes which sensitize silver halide emulsions to a shorter spectral range than the dyes disclosed in said application can be produced by employing an N-substituted 2-thio-4-ketotetrahydro oxazole compound or an N-substituted 2-thiohydantoin compound instead of the N-substituted rhodanine compound with a quaternary salt consisting of the quaternary salt of a 2-methyl thiazoline compound.

The dyes made according to this invention impart great speed or photosensitivity to silver halide emulsions, and frequently with a critical range of spectral response, and a principal object of the invention is to afford an economical method of manufacturing such dyes and photographic emulsions at a cost that is low and within the requirements of commercial needs. This is accomplished by dispensing with special linking agents such as heretofore employed and attaining the result by the reaction of a quaternary salt of a 2-methyl thiazoline with an N-substituted 2-thio-4-keto tetrahydro oxazole compound or with an N-substituted 2-thiohydantoin compound in the presence of a base such as triethylamine, which reaction takes place in the presence of a neutral solvent such as anhydrous n-propanol or anhydrous ethanol that does not enter into the reaction.

The invention consists in producing photographic sensitizing dyes by a novel process which depends on the breakdown of the 2-methyl thiazoline salt and the subsequent combination of a decomposition product of 2-methyl thiazoline with another equivalent of the quaternary salt and with the N-substituted 2-thiohydantoin compound or with the N-substituted 2-thio-4-keto-tetrahydro oxazole compound, the reaction occurring in a neutral solvent and in the presence of a base such as triethylamine which seems to initiate the reaction and neutralize the acidic by-products.

The reaction is believed to take place as follows:

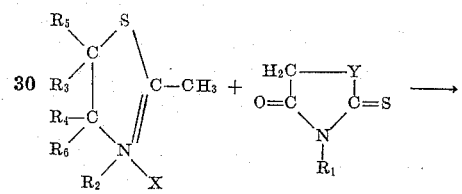

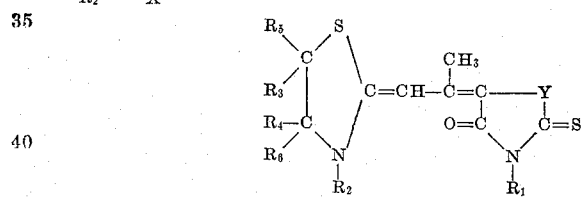

wherein $R_1$ is alkyl, lower aryl or the like, $R_2$ is lower alkyl, $R_3$, $R_4$, $R_5$ and $R_6$ are hydrogen or lower alkyl, X is an acid radical, and Y is $=O$ or $=NH$ and thus is the quantity needed to complete a 2-thiohydantoin or 2-thio-4-keto-tetrahydro oxazole nucleus.

In this reaction, as set forth in the examples, $R_1$ has been methyl, ethyl, isopropyl, phenyl and the like, $R_2$ has been methyl, ethyl, propyl and the like, and $R_3$ and $R_4$ have been hydrogen, methyl and ethyl, while X, which is split off in the reaction, may be any appropriate acid radical such as an iodide, p-toluene sulfonate or other similar radical. It will likewise be apparent that $R_1$, $R_2$, $R_3$, and $R_4$ may include other radicals such as butyl, isobutyl and other lower alkyl radicals.

The yields involved in the present invention depend somewhat on the particular quaternary salt of 2-methyl thiazoline that is used. In the reaction with N-substituted 2-thio-4-keto-tetrahydro oxazole, the best dye yields are obtained with 2-methyl thiazoline ethyl p-toluene sulfonate salt.

In the reaction with N-substituted 2-thiohydantoin, the dye yields are better than with the N-substituted 2-thio-4-keto-tetrahydro oxazole, and both the alkyl iodide and alkyl p-toluene sulfonate salts of 2-methyl thiazoline can be used with good results.

For making a photographic silver halide gelatin emulsion, the amounts of the different dyes used vary from approximately one to approximately twenty-five milligrams per kilogram of emulsion, depending on the final speed desired, the type of silver halide, the color sensitivity desired, and the type of emulsion. The concentration of the dye solution may vary, and solutions from one to ten parts of dye in ten thousand parts of solvent have been found successful. The gelatin or other photographic emulsions sensitized may be simple or mixed emulsions such as silver chloride, silver bromide, silver chlorobromide, silver iodobromide, or silver chlorobromoiodo emulsions.

The following are typical examples of practical methods of producing dyes in accordance with the invention, for use in sensitizing photographic emulsions.

Example I

A mixture of 54.6 grams of 2-methyl thiazoline methiodide and 15 grams of N-ethyl 2-thio-4-keto-tetrahydro oxazole was dissolved in 125 mls. of anhydrous ethanol, and 32 grams of triethylamine were added.

The solution was refluxed for four hours, then cooled and 300 mls. of water were added to crystallize out a dye, which was washed with ethyl ether, water, and more ether. The yield was 0.5 gram of an orange-yellow dye with a melting point of 166–167° C. The dye has an absorption maximum in alcohol from 420 to 470 millimicrons, and sensitizes to approximately 530 millimicrons.

Example II

A mixture of 90.3 grams of 2-methyl thiazoline ethyl p-toluene sulfonate, 14 grams of N-methyl-2-thio-4-keto-tetrahydro oxazole, 150 mls. of anhydrous n-propanol and 30.3 grams of triethylamine was refluxed for 6 hours. The solution was cooled and 700 mls. of water were added and the mixture was refrigerated overnight. On filtering and washing of the crystals with water and ether, 4.7 grams of orange-yellow dye were obtained. The dye was recrystallized from a mixture of methanol and chloroform to produce a final yield of 3.9 grams of an orange-yellow dye having a melting point of 179° C. The dye has an absorption maximum in alcohol from 420 to 480 millimicrons and sensitizes to approximately 530 millimicrons.

Example III

A mixture of 90 grams of 2-methyl thiazoline ethyl p-toluene sulfonate, 14.5 grams of N-ethyl-2-thio-4-keto-tetrahydro oxazole, 150 mls. of anhydrous n-propanol and 30.3 grams of triethylamine was refluxed for 4 hours. The solution was cooled somewhat, saturated with water, and refrigerated overnight. The mixture was filtered and the red crystals were washed with water and ethyl ether. The yield was 4.2 grams of crude dye. This was recrystallized from ethanol to give a final orange-red dye having a melting point of 151° C. The dye has an absorption maximum in alcohol from 420 to 480 millimicrons and sensitizes to 540 millimicrons.

Example IV

A mixture of 94.5 grams of 2.5 dimethyl thiazoline ethyl p-toluene sulfonate, 14.5 grams of N-ethyl-2-thio-4-keto-tetrahydro oxazole, 150 mls. of anhydrous ethanol, and 30.3 grams of triethylamine was refluxed for 8 hours. The solution was cooled, saturated with water, and filtered after refrigeration. The yield was 3.9 grams of bright orange crystals which were recrystallized from a mixture of chloroform and methanol to give a final product which melted at 168° C. The dye has an absorption maximum in alcohol from 420 to 480 millimicrons and sensitizes to approximately 530 millimicrons.

Example V

A mixture of 45 grams of 2-methyl thiazoline ethyl p-toluene-sulfonate, 9.65 grams of N-phenyl 2-thio-4-keto-tetrahydro oxazole, 100 mls. of anhydrous propanol and 16 grams of triethylamine was refluxed for 4 hours. On cooling, filtering and washing with alcohol, water, and ether, 2.7 grams of red needles having a melting point of 234° C. were obtained. This dye has an absorption maximum in alcohol from 440 to 500 millimicrons and sensitizes to approximately 570 millimicrons.

Example VI

A mixture of 48.6 grams of 2-methyl thiazoline methiodide, 14.4 grams of 3-N-ethyl 2-thiohydantoin, 125 mls. of anhydrous ethanol, and 32 grams of triethylamine was refluxed for 6 hours. The solution was cooled and filtered, to obtain 2.6 grams of red, needle-like crystals which, after washing with alcohol, water, alcohol and ether, had a melting point of 245° C. The filtrate was diluted with 300 mls. of water and placed in a refrigerator overnight, giving more dye which was washed with water, alcohol, and ether, and boiled out with absolute alcohol to produce another 2.3 grams of tomato-red crystals with a melting point of 245° C. The dye has an absorption maximum in alcohol from 420 to 480 millimicrons and sensitizes to 540 millimicrons.

Example VII

A mixture of 24.3 grams of 2-methyl thiazoline methiodide, 7.2 grams of 3-N-ethyl-2-thiohydantoin, 100 mls. of anhydrous n-propanol, and 9 grams of piperidine was refluxed for 5 hours. On cooling the solution, 4.6 grams of dye were obtained which when boiled out with 100 mls. of alcohol, weighed 4.3 grams.

Example VIII

A mixture of 60.3 grams of 2-methyl thiazoline ethyl p-toluene sulfonate, 10.3 grams of 3-N-ethyl-2-thiohydantoin, 125 mls. of anhydrous ethanol and 32 grams of triethylamine was refluxed for 9 hours. The solution was cooled, saturated with water and refrigerated overnight. The yield was 9.2 grams of red dye, 7.8 grams of which were recrystallized from alcohol to give 5.4 grams of light, pink-red crystals with a melting point of 232° C. The dye has an absorption maximum in alcohol from 420 to 500 millimicrons and sensitizes to 520 millimicrons.

Example IX

A mixture of 48.6 grams of 2-methyl thiazoline methiodide, 13.0 grams of N-methyl-2-thiohydantoin, 125 mls. of anhydrous n-propanol, and 22 grams of triethylamine was refluxed for 4 hours. The solution was cooled somewhat and filtered to obtain 4.5 grams of orange-brown dye. The reaction solution was saturated with water, refrigerated, and filtered to give an additional 4 grams of dye. After boiling out the dye in a mixture of chloroform and alcohol, it had a melting point of 249° C. The dye has an absorption maximum in alcohol from 420 to 500 millimicrons and sensitizes to approximately 540 millimicrons.

*Example X*

A mixture of 48.6 grams of 2-methyl thiazoline methiodide, 19.2 grams of N-phenyl-2-thiohydantoin, 300 mls. of anhydrous n-propanol, and 22 grams of triethylamine was refluxed for 4 hours. The solution was cooled and filtered to obtain 6 grams of dark maroon-red crystals. To the reaction solution was added sufficient water to saturate it, the mixture was chilled overnight, and an additional 4 grams of red dye was thus realized. After boiling out the dye in a mixture of alcohol and chloroform, it melted at 260° C. The dye has an absorption maximum in alcohol from 420 to 500 millimicrons and sensitizes to approximately 540 millimicrons.

*Example XI*

A mixture of 32 parts n-propyl p-toluene sulfonate and 15 parts 2-methyl thiazoline was heated for 2½ hours at 135° and then cooled. A solid quaternary salt resulted, which salt was dissolved in 130 parts of anhydrous n-propanol. To this solution were added 11 parts of n-ethyl 2-thio-4-keto-tetrahydro oxazole and 20 parts of triethylamine. The resulting solution was heated under reflux for 7 hours and then cooled. Water was added to saturate the solution and a crude dye was precipitated. Upon recrystallization from alcohol, an orange-red crystalline dye was recovered. The product melted sharply at 175° C. and sensitized a photographic emulsion.

*Example XII*

A mixture of 61 parts 2-methyl thiazoline and 111.6 parts methyl p-toluene sulfonate was heated for 2 hours and cooled. The resulting solid product was dissolved in 300 parts of anhydrous n-propanol. To the solution were added 31.2 parts N-isopropyl-2-thio-4-keto tetrahydro oxazole and 80 parts triethylamine. The solution was then heated under reflux for 5 hours and cooled. Crystallization started upon cooling and was further promoted by adding water to saturate the solution. The solid product was recrystallized from alcohol to yield a crystalline product.

*Example XIII*

The procedure of Example X was followed using one molar proportions of N-ethyl-2-thio-4-keto-tetrahydro oxazole and 2 molar proportions each of 2-methyl-4,4-dimethyl thiazoline and ethyl p-toluene sulfonate, employing n-propanol as reaction solvent and triethylamine as the reaction promoting base. The product was a crystalline dye which operated to sensitize a photographic emulsion.

The examples indicate that a 2-methyl thiazoline quaternary salt can be condensed with a nitrogen-substituted 2-thiohydantoin compound or with a nitrogen-substituted 2-thio-4-keto-tetrahydro oxazole compound in a neutral solvent such as anhydrous alcohol and in the presence of a base such as triethylamine. In place of triethylamine, other bases such as piperidine may be used, and instead of alcohol, other neutral anhydrous solvents may be employed.

The principal feature of the invention lies in the reaction between a 2-methyl thiazoline salt and a nitrogen-substituted 2-thiohydantoin or nitrogen-substituted 2-thio-4-keto-tetrahydro oxazole compound in the presence of a base, wherein it is believed that one mole of the 2-methyl thiazoline salt decomposes to give an intermediate which combines with another mole of the 2-methyl thiazoline salt, apparently as a linking agent between it and the nitrogen-substituted 2-thiohydantoin or the nitrogen-substituted 2-thio-4-keto-tetrahydro oxazole compound.

The invention is not confined to the materials or procedural details herein disclosed, and this application is intended to cover such variations and changes as may be had without departing from the intent of the invention or the scope of the appended claims.

This application is a continuation-in-part of our copending application Ser. No. 757,662, filed June 27, 1947, now abandoned, entitled "Method of Making Photographic Sensitizing Dyes."

We claim:

1. The process of making an asymmetric photosensitizing dye which consists of mixing a base selected from the group consisting of aliphatic amines and saturated heterocyclic amines with a quaternary salt of the general formula:

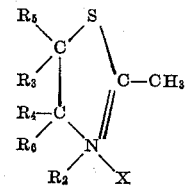

wherein $R_2$ is lower alkyl, $R_3$, $R_4$, $R_5$, and $R_6$ are the same or different members selected from the group consisting of hydrogen and lower alkyl and X is an acid radical, and with a five-membered heterocylic compound of the formula:

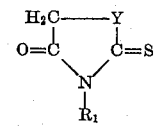

wherein $R_1$ is a member of the group consisting of alkyl and lower aryl and Y is selected from the group consisting of $=O$ and $=NH$ and thus is the quantity to complete a 2-thio hydantoin or 2-thio-4-keto tetrahydro oxazole nucleus, and reacting said ingredients in an anhydrous neutral solvent, the molecular parts of the quaternary salt being substantially in excess of the molecular parts of the five-membered heterocyclic compound and said excess quaternary salt producing a decomposition product which links the thiazoline radical resulting from another molecular part of the quaternary salt with the five-membered heterocyclic nucleus, said decomposition product constituting the linking agent.

2. The process according to claim 1 wherein at least two of the groups $R_3$, $R_4$, $R_5$, and $R_6$ are hydrogen and the remaining $R_1$, $R_2$, $R_3$, $R_4$, $R_5$ and $R_6$ groups are lower alkyl.

JOHN H. DESSAUER.
MICHAEL A. INSALACO.

No references cited.